(12) United States Patent
Offenhaeuser et al.

(10) Patent No.: US 11,846,523 B2
(45) Date of Patent: Dec. 19, 2023

(54) METHOD AND SYSTEM FOR CREATING A LOCALIZATION MAP FOR A VEHICLE

(71) Applicant: Robert Bosch GmbH, Stuttgart (DE)

(72) Inventors: Andreas Offenhaeuser, Tsuzuki-ku (JP); Peter Christian Abeling, Hannover (DE)

(73) Assignee: ROBERT BOSCH GMBH, Stuttgart (DE)

( * ) Notice: Subject to any disclaimer, the term of this patent is extended or adjusted under 35 U.S.C. 154(b) by 166 days.

(21) Appl. No.: 16/856,514

(22) Filed: Apr. 23, 2020

(65) Prior Publication Data

US 2020/0370919 A1 Nov. 26, 2020

(30) Foreign Application Priority Data

May 20, 2019 (DE) .......................... 102019207303.4

(51) Int. Cl.
*G01C 21/00* (2006.01)
*G01C 21/36* (2006.01)
(Continued)

(52) U.S. Cl.
CPC ...... *G01C 21/3811* (2020.08); *G01C 21/3484* (2013.01); *G01C 21/3492* (2013.01);
(Continued)

(58) Field of Classification Search
None
See application file for complete search history.

(56) References Cited

U.S. PATENT DOCUMENTS 10,612,932 B2 * 4/2020 Sunil Kumar ....... G05D 1/0212
10,969,229 B2 * 4/2021 Akiva ................ G01C 21/3848
(Continued)

FOREIGN PATENT DOCUMENTS

CN 112461249 A * 3/2021 .......... G01C 21/367
DE 19756297 A1 7/1999
(Continued)

OTHER PUBLICATIONS

Dennis Goedegebuure, "You Are Helping Google AI Image Recognition", Nov. 29, 2016, https://medium.com/@thenextcorner/you-are-helping-google-ai-image-recognition-b24d89372b7e (Year: 2016).*
(Continued)

*Primary Examiner* — Redhwan K Mawari
(74) *Attorney, Agent, or Firm* — NORTON ROSE FULBRIGHT US LLP; Gerard Messina

(57) ABSTRACT

A method for creating a radar localization map. The method includes: a) sensing a defined region using a surround-field sensor of a mapping vehicle; b) providing photographic satellite data of the defined region with the aid of a satellite, c) determining matching detected objects of the region in the surround-field sensor data and in the photographic satellite data; d) generating a transfer model from the matching detected objects, the photographic satellite data being transferable reciprocally into the surround-field sensor data utilizing the transfer model; and e) creating the radar localization map by use of the transfer model using photographic satellite data, the photographic satellite data being converted into corresponding data of the radar localization map.

6 Claims, 2 Drawing Sheets

(51) Int. Cl.
   *G01C 21/34*   (2006.01)
   *G06V 20/13*   (2022.01)
   *G06V 20/56*   (2022.01)
(52) U.S. Cl.
   CPC ......... *G01C 21/3694* (2013.01); *G06V 20/13* (2022.01); *G06V 20/56* (2022.01)

(56) References Cited

U.S. PATENT DOCUMENTS

| | | | | |
|---|---|---|---|---|
| 11,041,730 | B2* | 6/2021 | Colgate | G01C 21/3841 |
| 11,692,838 | B1* | 7/2023 | Gibson | G05D 1/0088 |
| | | | | 701/25 |
| 2010/0074555 | A1* | 3/2010 | Diaz | G06V 20/176 |
| | | | | 382/284 |
| 2012/0087546 | A1* | 4/2012 | Focke | B60R 1/00 |
| | | | | 382/104 |
| 2015/0193963 | A1* | 7/2015 | Chen | G06T 17/05 |
| | | | | 345/426 |
| 2016/0239983 | A1* | 8/2016 | Dorum | G01C 11/04 |
| 2017/0343362 | A1* | 11/2017 | Shen | G06V 20/56 |
| 2018/0111683 | A1* | 4/2018 | Di Benedetto | G06Q 10/083 |
| 2019/0137286 | A1* | 5/2019 | Mielenz | G01C 21/3811 |
| 2019/0206124 | A1* | 7/2019 | Zhou | G06V 20/56 |
| 2019/0244400 | A1 | 8/2019 | Hamer et al. | |
| 2020/0349852 | A1* | 11/2020 | DiCosola | G08G 5/0043 |
| 2020/0372808 | A1* | 11/2020 | Carraway | H04W 12/069 |

FOREIGN PATENT DOCUMENTS

| | | | | |
|---|---|---|---|---|
| DE | 102016210495 | A1 | 12/2017 | |
| DE | 102016220308 | A1 * | 4/2018 | G01C 21/32 |
| DE | 102016220308 | A1 * | 4/2018 | G06T 11/203 |
| WO | 2017215964 | A1 | 12/2017 | |

OTHER PUBLICATIONS

United States Department of State, "Cuban Missile Crisis", 2010, https://web.archive.org/web/20100527171609/http://future.state.gov/educators/slideshow/cuba/cuba2.html (Year: 2010).*

Lynn Jenner, "Sergio (Eastern Pacific Ocean) 2018", Oct. 10, 2018, https://blogs.nasa.gov/hurricanes/2018/10/10/sergio-eastern-pacific-ocean-2018-4/ (Year: 2018).*

* cited by examiner

METHOD AND SYSTEM FOR CREATING A LOCALIZATION MAP FOR A VEHICLE

CROSS REFERENCE

The present application claims the benefit under 35 U.S.C. § 119 of German Patent Application No. DE 102019207303.4 filed on May 20, 2019, which is expressly incorporated herein by reference in its entirety.

FIELD

The present invention relates to a method for creating a localization map for a vehicle. The present invention further relates to a system for creating a localization map for a vehicle. In addition, the present invention relates to a computer-program product having program code for carrying out the method.

BACKGROUND INFORMATION

Conventional methods for fleet mapping and the creation of radar localization maps are available.

Conventionally, an exact vehicle position can be determined by detecting landmarks and comparing already familiar landmarks to a map. In that case, using a radar sensor, the vehicle determines unique landmarks in its surroundings and compares them to a map stored in the vehicle. By combining several landmarks, it is thereby possible to determine an exact position of the vehicle.

Methods carried out by Google®, in which three-dimensional building models are generated from satellite information are also available.

German Patent Application No. DE 10 2016 210 495 A1 describes a method and a device for creating an optimized localization map and a method for creating a localization map for a vehicle, in which data from a radar satellite are utilized.

PCT Application No. WO 2017/215964 A1 describes utilizing a satellite to create radar maps that are suitable for the localization of vehicles. A method is described to create an optimized localization map for a vehicle. The method includes a step of providing at least one localization map that represents at least one position of a landmark read in by a vehicle read-in unit. The method also includes a step of reading in a radar map via an interface, the radar map having or imaging at least one further position of the landmark in the radar map provided with the aid of radar measuring by a satellite. Finally, the method includes a step of generating and storing an optimized localization map by combining the localization map with the radar map.

SUMMARY

An object of the present invention is to provide an improved method for creating a localization map for a vehicle.

According to a first aspect of the present invention, the objective may be achieved with a method for creating a localization map for a vehicle. An example method in accordance with the present invention includes the following steps:

a) Sensing a defined region with the aid of a surround-field sensor of a mapping vehicle;
b) Providing photographic satellite data of the defined region with the aid of a satellite;
c) Determining matching detected objects of the region in the surround-field sensor data and in the photographic satellite data;
d) Generating a transfer model from the matching detected objects, the photographic satellite data being transferable reciprocally into the surround-field sensor data utilizing the transfer model; and
e) Creating the localization map by use of the transfer model with the aid of photographic satellite data, the photographic satellite data being converted into corresponding data of the localization map.

In this way, a radar map is realized with a trained system in the form of a so-called "transfer model", the transfer model having the ability to convert photographic satellite data into surround-field sensor data and vice versa. Advantageously, the localization map may thus be created exclusively with satellite data, in doing so, advantage being taken of the fact that as a rule, an updating rate of photographic satellite data is very high, and as a result, the localization map is kept highly up-to-date.

It is advantageous that using the example method in accordance with the present invention, it is not necessary for mapping vehicles to travel extensively through areas to be mapped. It is thus expediently possible to provide the localization map solely with the aid of photographic satellite data and the transfer model.

Therefore, it is advantageous that a fleet of mapping vehicles may be reduced considerably. Only a statistically loadable image of one defined region must be generated with the mapping vehicle. The radar map may then also be "rolled out" expediently to regions not yet traversed.

According to a second aspect of the present invention, the objective may be achieved with a system. In accordance with the present invention, an example system for creating a localization map for a vehicle includes:

a modeling device having a transfer model, surround-field sensor data and photographic satellite data being transferable reciprocally into each other with the aid of the transfer model; and
a mapping device which is functionally connected to the modeling device and is designed to provide the localization map, utilizing the transfer model and supplied photographic satellite data.

Advantageous further developments of the method are described herein.

One advantageous further development of the example method in accordance with the present invention provides that steps a) through d) are carried out once or multiple times. In this way, the transfer model may be provided with any accuracy as desired.

A further advantageous development of the example method in accordance with the present invention provides that step e) is carried once or multiple times. Thus, in each instance, the localization map may be created with the most up-to-date photographic satellite data. This beneficially promotes high accuracy of the localization map.

A further advantageous development of the example method in accordance with the present invention provides that in step d), a manual classification is carried out for the reciprocal transfer of the photographic satellite data into the surround-field sensor data. In this way, relevant and non-relevant objects are classified and may thus be distinguished from each other. In so doing, for example, houses, traffic signs, objects of nature, etc. are able to be distinguished from signal noise, which as a consequence, may be ignored and does not influence the creation of the localization map. As a result, real objects and satellite images may thus be assigned to one another.

According to a further advantageous development of the example method in accordance with the present invention, step e) is carried out with up-to-date photographic satellite data of a mapping region. In this manner, the most current photographic satellite data may be used in each case for creating an up-to-the-minute localization map, in so doing, it being an advantage that a mapping vehicle does not have to travel through the mapping region.

According to a further advantageous development of the example method according to the present invention, a radar sensor is used as surround-field sensor of the mapping vehicle. Thus, a surround-field sensor usually already available in the vehicle may be used to inexpensively supply the surround-field sensor data.

According to a third aspect of the present invention, the objective may be achieved with an example computer-program product having program code, which are executed in the example system or stored on a machine-readable storage medium. In this way, the method may advantageously take the form of software and may thus be easily and efficiently modified and adapted.

Further measures improving the present invention are described in greater detail below together with the description of the preferred exemplary embodiments of the present invention on the basis of figures.

BRIEF DESCRIPTION OF THE DRAWINGS

The figures are merely schematic and not true to scale. Identical, identically operative or similar elements are provided throughout with the same reference numerals in the figures.

DETAILED DESCRIPTION OF EXAMPLE EMBODIMENTS

In accordance with the present invention, an example system is provided which, similar to the approach of Google® indicated above for generating 3D models, utilizes photographic satellite images to create a map of radar landmarks (i.e., a radar map or a radar localization map). To that end, first of all reference data must be run in with a mapping vehicle or a fleet of mapping vehicles, which with a highly accurate GPS, generates a radar image of an area. The landmarks determined from this are recorded from the perspective of the mapping vehicles and are processed to form a reference localization map or a transfer model M. For instance, this processing may be carried out in a central processing unit, e.g., based on the cloud.

Figure 1:
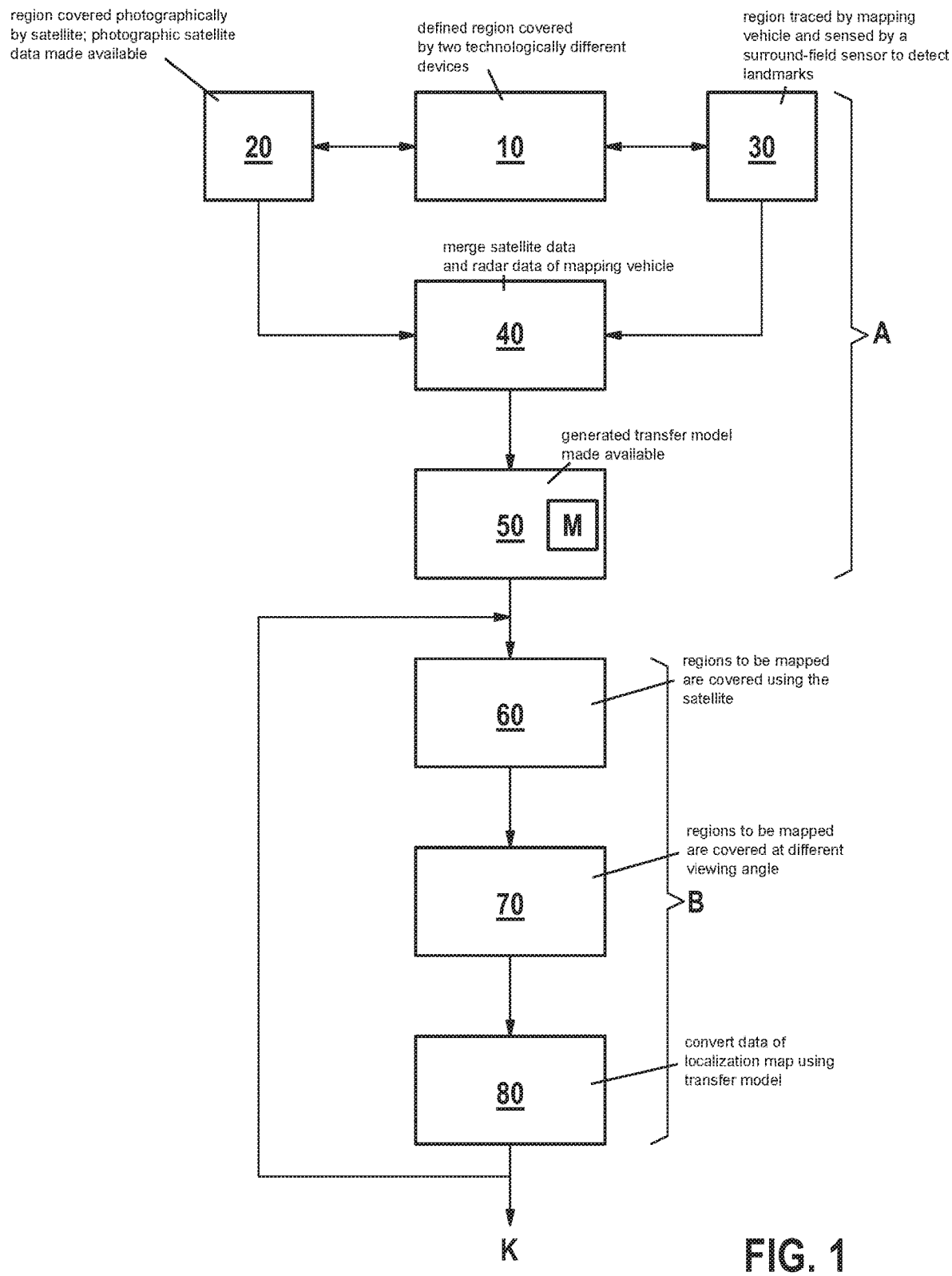
FIG. 1 shows a system diagram with a representation of an example method for creating a localization map for a vehicle, in accordance with the present invention.

FIG. 1 shows a system diagram with a representation of one specific embodiment of the proposed method. In a first step, a defined region 10 is covered by two technologically different devices, close together in time.

On one hand, in a step 20, region 10 is covered photographically by a satellite, and thus photographic satellite data SD are made available. Close in time to step 20, generally the same defined region 10 is traced in a step 30 by a mapping vehicle (not shown) and sensed by a surround-field sensor, preferably a radar sensor, in doing which, specific landmarks (e.g., houses, traffic signs, buildings, objects of nature, etc.) being detected for region 10.

The photographic satellite data in the form of "satellite photos" generated in step 20 and the radar data of the mapping vehicle are merged in a step 40, matching objects ascertained in the photographic satellite data and in the radar data being determined. The indicated matching objects ascertained form what is referred to as a transfer model M that preferably is taught or trained off-line in a computer center with additional photographic satellite data and surround-field sensor data, which may be carried out utilizing a neural network, for example.

Thus, the premise is that region 10, which is covered by the mapping vehicle using sensors, is covered photographically by the satellite as simultaneously as possible. A time delay between the vehicle mapping and the pictorial coverage of defined region 10 by the satellite should at a maximum be such that no significant changes occur with respect to the infrastructure of defined region 10 between the coverages by the mapping vehicle and by the satellite, since the image contents of the mapping vehicle and of the satellite must be very similar for the purpose of generating transfer model M.

Defined region 10 considered should preferably include as many as possible, or even better, all relevant landmark types (e.g., road signs, trees, houses, objects of nature, etc.). At the same time, it is also advantageous if the photographic satellite images were taken from various angles in order to provide as many different views of the landmarks as possible.

In a step 50, transfer model M generated in the manner indicated above is now available. Consequently, phase A of the creation of the localization map is concluded.

Thus, phase A of the example method includes the providing and the teaching or training of transfer model M, which is able to identify relevant landmarks from the photographic images of the satellite. In this connection, first of all, with the aid of the satellite images, all those objects are classified which later are wanted in the localization map. This classification may be carried out manually or with the assistance of customary classification methods. As a result, a set of training data is formed by which a machine learning algorithm (e.g., a neural network in the form of a convolutional network) is able to be trained.

Ideally, using the example method, in phase A, a defined region 10 is therefore covered only one time from two different views or viewing angles. Utilizing transfer model M thereby generated, in following phase B, it is possible to convert satellite data or photos into landmarks of a localization map for a vehicle and vice versa.

Subsequently, in a phase B, the transfer model generated in phase A is now used to create the localization map, in doing so, only photographic satellite data now being utilized to create the localization map.

For this purpose, in a step 60, regions to be mapped are covered with the aid of the satellite, preferably with a high-resolution camera. In a step 70, the regions to be mapped are covered at a different viewing angle, in doing so, position data (e.g., GPS position data) always being acquired as well, and being stored together with the photographically acquired data.

In a step 80, utilizing transfer model M generated in phase A, the satellite data are converted into data of localization map K, resulting in the creation of localization map K.

Localization map K is thereby available in electronic form and may be utilized by a user vehicle in a conventional manner in order to determine a highly accurate position of the user vehicle from sensorially acquired surround-field sensor data (e.g., radar data, lidar data, ultrasonic data, camera data, etc.) in cooperation with localization map K. The highly accurate knowledge of positions of objects from the satellite data, which is made usable for the localization of objects of localization map K, is thus exploited.

Transfer model M determined in phase A may be used advantageously for regions not travelled over by mapping vehicles, in order to create there a rudimentary localization map K or even a complete localization map K. Using the method proposed, it is advantageously possible to generate localization maps for regions through which no mapping vehicles or specific measuring vehicles have yet traveled, however photographic image data from specific satellites are available.

It is advantageous that the steps of phase B may easily be carried out repeatedly with new or highly topical photographic satellite data, so that localization map K may constantly be further improved and kept highly up-to-date.

As a result, it is advantageous that using the example method in accordance with the present invention, it is no longer necessary, as provided in the related art, for large fleets of mapping vehicles to travel through regions to be mapped and to cover them using sensor technology. As a consequence, logistic and technical expenditure for the creation of localization maps may be minimized beneficially.

Consequently, it is advantageously possible to create radar localization maps K substantially faster, more efficiently and more cost-effectively.

Figure 2:
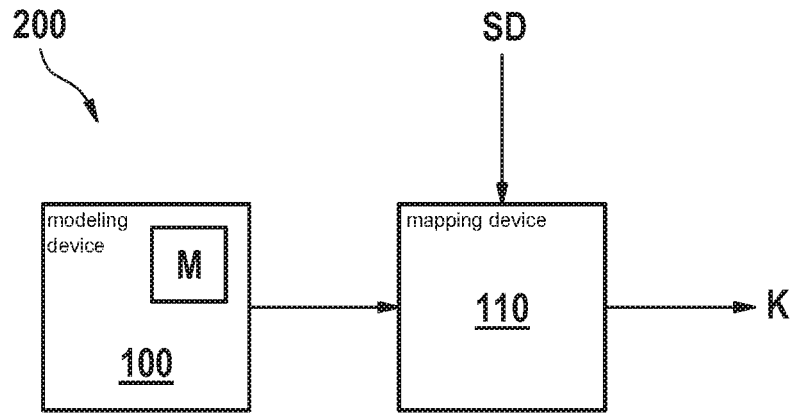
FIG. 2 shows a block diagram of an example system for creating a localization map for a vehicle, in accordance with the present invention.

FIG. 2 shows a block diagram of an example system 200 for creating a localization map for a vehicle, in accordance with the present invention.

A modeling device 100 is shown, which is used to generate a transfer model M and to transmit it to a mapping device 110. Mapping device 110 is functionally connected to modeling device 100. Employing transfer model M, mapping device 110 is used to create localization map K for a vehicle from supplied photographic satellite data SD in the manner described above.

Figure 3:
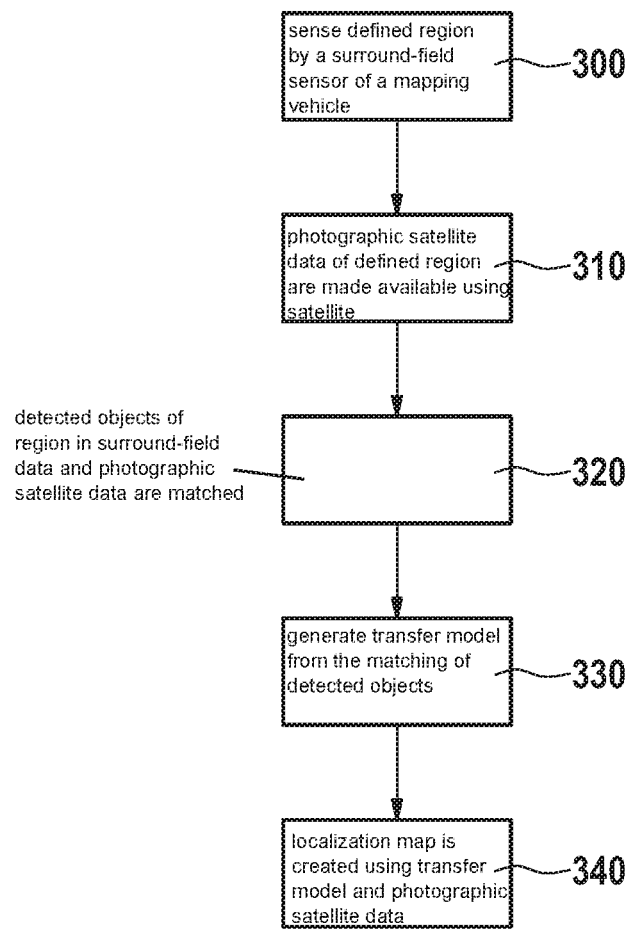
FIG. 3 shows a functional sequence of an example method for creating a localization map for a vehicle in accordance with the present invention.

FIG. 3 shows a functional sequence of an example method for creating a localization map K for a vehicle, in accordance with the present invention.

In a step 300, a defined region 10 is sensed by a surround-field sensor of a mapping vehicle.

In a step 310, photographic satellite data SD of defined region 10 are made available with the aid of a satellite.

In a step 320, matching detected objects of region 10 in the surround-field sensor data and in photographic satellite data SD are determined.

In a step 330, a transfer model M is generated from the matching detected objects, photographic satellite data SD being transferable reciprocally into the surround-field sensor data with the aid of transfer model M.

In a step 340, localization map K is created utilizing transfer model M with the aid of photographic satellite data SD, photographic satellite data SD being converted into corresponding data of localization map K.

Advantageously, it is possible to implement all indicated components of system 200 in software, thereby promoting efficient and easy adaptability of the method.

In implementing the present invention, one skilled in the art will also realize specific embodiments not explained above.

What is claimed is:

1. A method for creating a localization map for a vehicle, the method comprising:
   a) sensing, via a surround-field sensor of a mapping vehicle, a defined region by driving the mapping vehicle in the defined region, so that the surround-field sensor is able to sense the defined region;
   b) providing, via a satellite data link, photographic satellite data of the defined region;
   c) determining, via a processor, matching detected objects of the region in the surround-field sensor data and in the photographic satellite data;
   d) generating a transfer model from the matching detected objects, the photographic satellite data being transferable reciprocally into the surround-field sensor data using the transfer model, and transmitting the transfer model to the mapping vehicle;
   e) creating, via the processor, the localization map using of the transfer model using further photographic satellite data, the further photographic satellite data being converted into corresponding data of the localization map;
   f) operating, via the processor, the mapping vehicle in the defined region, so that travel by the mapping vehicle is at least reduced in the defined region;
   g) merging, via the processor, the photographic satellite data, including in the form of satellite photos, and radar data of the mapping vehicle;
   h) determining, via the processor, matching objects ascertained in the photographic satellite data and in the radar data, wherein the ascertained matching objects form the transfer model;
   i) providing, the defined region being covered photographically by the satellite, the photographic satellite data to the transfer model, wherein the defined region is traced by the mapping vehicle and sensed by the surround-field sensor, which is a radar sensor, the matching objects being detected for the defined region;
   j) converting, via the processor and the transfer model, the photographic satellite data into the surround-field sensor data and/or converting the surround-field sensor data into the photographic satellite data, wherein the localization map is created using the satellite data, and wherein an updating rate of photographic satellite data keeps the localization map up-to-date, so that the travel by the mapping vehicle is at least reduced in the defined region;
   wherein the defined region is covered by two different devices,
   wherein the region, which is covered by the mapping vehicle using sensors, is covered photographically by the satellite, so that a time delay between the vehicle mapping and pictorial coverage of the defined region by the satellite should at a maximum be such that no significant changes occur with respect to the infrastructure of the defined region between the coverages by the mapping vehicle and by the satellite, since the image contents of the mapping vehicle and imaging contents of the satellite are the same for generating the transfer model, and
   wherein the transfer model is used to generate localization maps for regions through which no mapping vehicles or specific measuring vehicles have yet traveled, but for which photographic image data from satellites are available.

2. The method as recited in claim 1, wherein steps a) through d) are carried out once or multiple times.

3. The method as recited in claim 1, wherein step e) is carried out once or multiple times.

4. The method as recited in claim 1, wherein in step d), a manual classification is carried out for the reciprocal transfer of the photographic satellite data into the surround-field sensor data.

5. A system for creating a localization map for a vehicle, comprising:
 a non-transitory machine-readable storage medium, on which is stored a computer program, which is executable by a processor, including:
  a program code arrangement having program code for creating a localization map for a vehicle, by performing the following:
   providing a transfer model to provide modeling, surround-field sensor data and photographic satellite data being transferable reciprocally into each other using the transfer model; and
   providing mapping, wherein the mapping is functionally associated with the modeling and is for providing the localization map, using the transfer model and supplied photographic satellite data;
 wherein the system is configured to perform the following:
  a) sensing, via a surround-field sensor of a mapping vehicle, a defined region by driving the mapping vehicle in the defined region, so that the surround-field sensor is able to sense the defined region;
  b) providing, via a satellite data link, photographic satellite data of the defined region;
  c) determining, via a processor, matching detected objects of the region in the surround-field sensor data and in the photographic satellite data;
  d) generating, via the processor, a transfer model from the matching detected objects, the photographic satellite data being transferable reciprocally into the surround-field sensor data using the transfer model, and transmitting the transfer model to the mapping vehicle;
  e) creating, via the processor, the localization map using of the transfer model using further photographic satellite data, the further photographic satellite data being converted into corresponding data of the localization map;
  f) operating, via the processor, the mapping vehicle in the defined region, so that travel by the mapping vehicle is at least reduced in the defined region;
  g) merging, via the processor, the photographic satellite data, including in the form of satellite photos, and radar data of the mapping vehicle;
  h) determining, via the processor, matching objects ascertained in the photographic satellite data and in the radar data, wherein the ascertained matching objects form the transfer model;
  i) providing, the defined region being covered photographically by the satellite, the photographic satellite data to the transfer model, wherein the defined region is traced by the mapping vehicle and sensed by the surround-field sensor, which is a radar sensor, the matching objects being detected for the defined region;
  j) converting, via the processor and the transfer model, the photographic satellite data into the surround-field sensor data and/or converting the surround-field sensor data into the photographic satellite data, wherein the localization map is created using the satellite data, and wherein an updating rate of photographic satellite data keeps the localization map up-to-date, so that the travel by the mapping vehicle is at least reduced in the defined region;
 wherein the defined region is covered by two different devices,
 wherein the region, which is covered by the mapping vehicle using sensors, is covered photographically by the satellite, so that a time delay between the vehicle mapping and pictorial coverage of the defined region by the satellite should at a maximum be such that no significant changes occur with respect to the infrastructure of the defined region between the coverages by the mapping vehicle and by the satellite, since the image contents of the mapping vehicle and imaging contents of the satellite are the same for generating the transfer model, and
 wherein the transfer model is used to generate localization maps for regions through which no mapping vehicles or specific measuring vehicles have yet traveled, but for which photographic image data from satellites are available.

6. A non-transitory machine-readable storage medium, on which is stored a computer program, which is executable by a processor, comprising:
 a program code arrangement having program code for creating a localization map for a vehicle, by performing the following:
  a) sensing, via a surround-field sensor of a mapping vehicle, a defined region by driving the mapping vehicle in the defined region, so that the surround-field sensor is able to sense the defined region;
  b) providing, via a satellite data link, photographic satellite data of the defined region;
  c) determining, via the processor, matching detected objects of the region in the surround-field sensor data and in the photographic satellite data;
  d) generating, via the processor, a transfer model from the matching detected objects, the photographic satellite data being transferable reciprocally into the surround-field sensor data using the transfer model, and transmitting the transfer model to the mapping vehicle;
  e) creating, via the processor, the localization map using of the transfer model using further photographic satellite data, the further photographic satellite data being converted into corresponding data of the localization map;
  f) operating, via the processor, the mapping vehicle in the defined region, so that travel by the mapping vehicle is at least reduced in the defined region;
  g) merging, via the processor, the photographic satellite data, including in the form of satellite photos, and radar data of the mapping vehicle;
  h) determining, via the processor, matching objects ascertained in the photographic satellite data and in the radar data, wherein the ascertained matching objects form the transfer model;
  i) providing, the defined region being covered photographically by the satellite, the photographic satellite data to the transfer model, wherein the defined region is traced by the mapping vehicle and sensed by the surround-field sensor, which is a radar sensor, the matching objects being detected for the defined region;

j) converting, via the processor and the transfer model, the photographic satellite data into the surround-field sensor data and/or converting the surround-field sensor data into the photographic satellite data, wherein the localization map is created using the satellite data, and wherein an updating rate of photographic satellite data keeps the localization map up-to-date, so that the travel by the mapping vehicle is at least reduced in the defined region;

wherein the defined region is covered by two different devices, wherein the region, which is covered by the mapping vehicle using sensors, is covered photographically by the satellite, so that a time delay between the vehicle mapping and pictorial coverage of the defined region by the satellite should at a maximum be such that no significant changes occur with respect to the infrastructure of the defined region between the coverages by the mapping vehicle and by the satellite, since the image contents of the mapping vehicle and imaging contents of the satellite are the same for generating the transfer model, and wherein the transfer model is used to generate localization maps for regions through which no mapping vehicles or specific measuring vehicles have yet traveled, but for which photographic image data from satellites are available.

* * * * *